United States Patent Office 3,321,740
Patented May 23, 1967

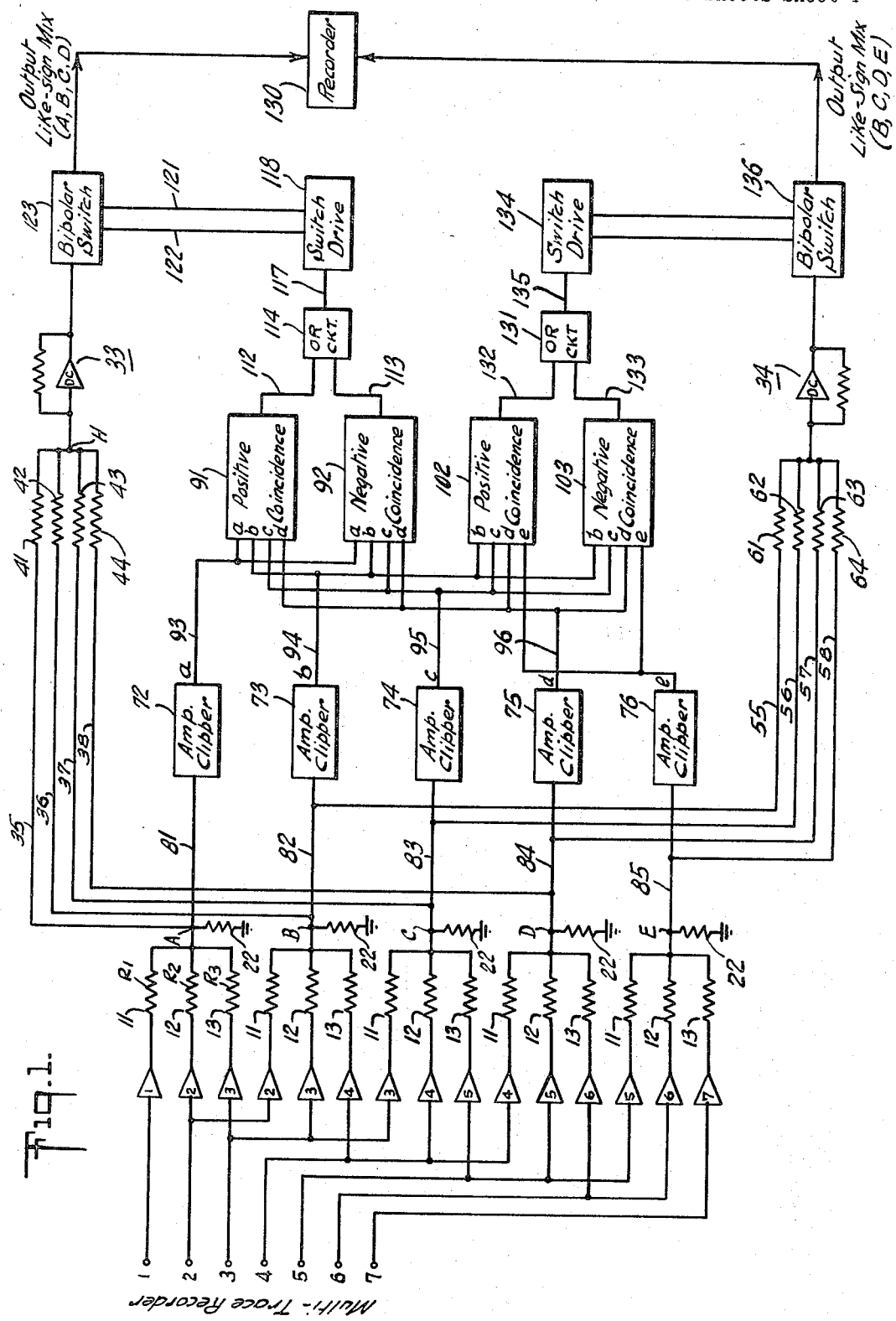

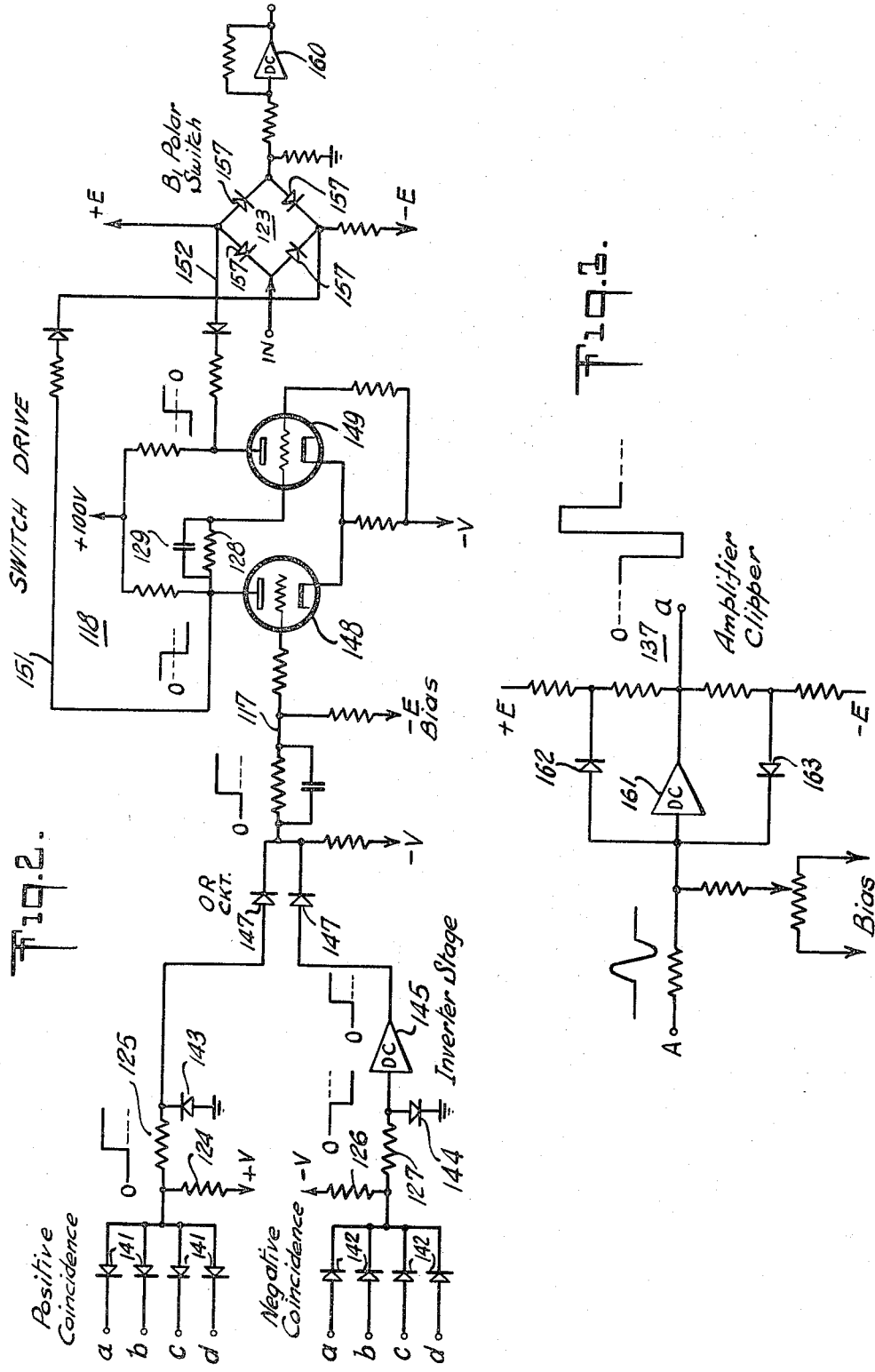

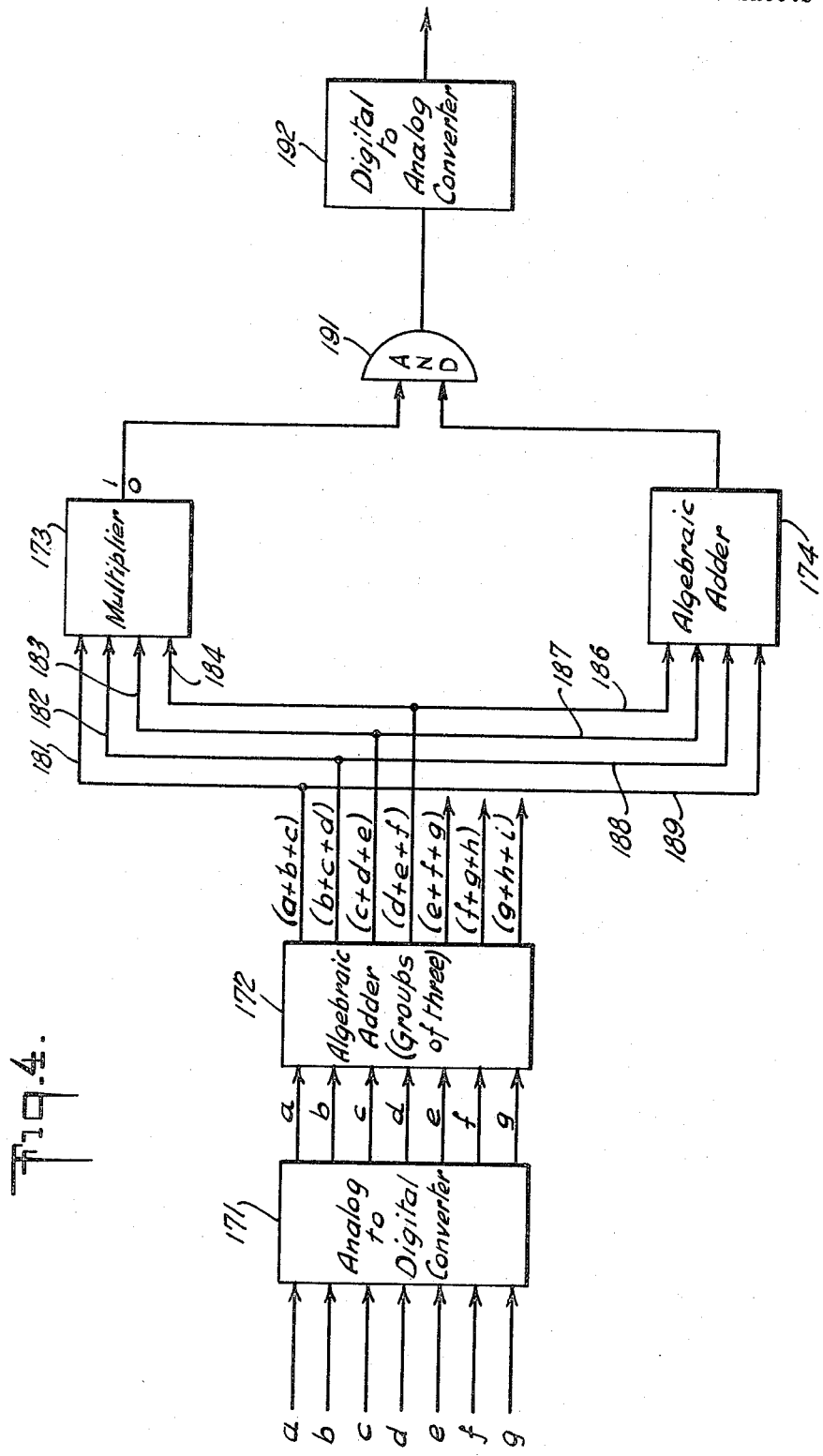

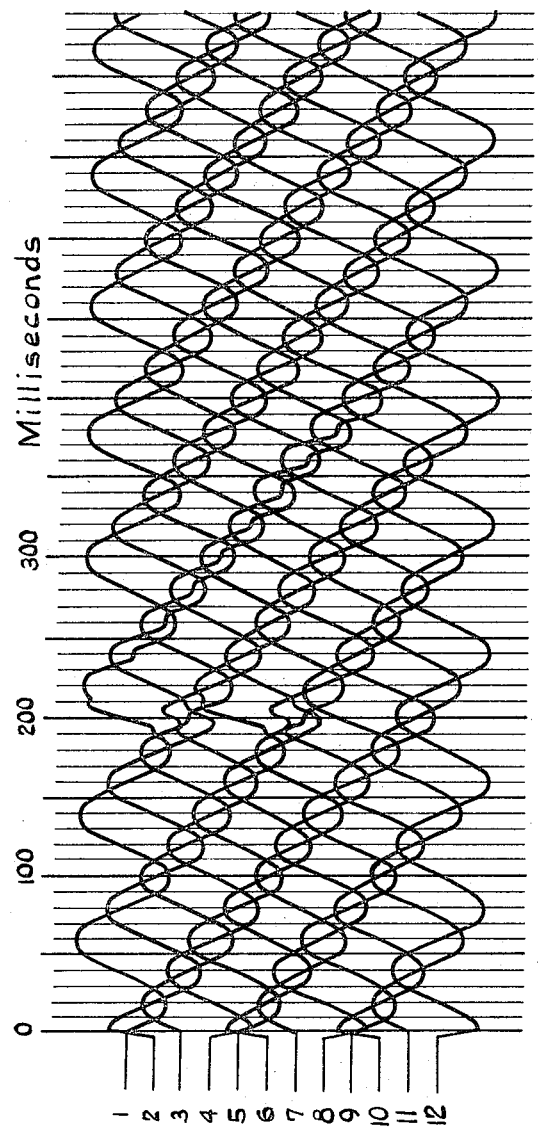

3,321,740
METHOD AND APPARATUS FOR SELECTIVELY COMBINING SIGNALS TO DISTINGUISH CORRELATIVE DATA FROM NON-CORRELATIVE DATA
Burton D. Lee, Houston, Tex., assignor to Texaco Inc., New York, N.Y., a corporation of Delaware
Filed Dec. 22, 1964, Ser. No. 420,378
22 Claims. (Cl. 340—15.5)

This invention relates to the processing of electrical signals and, more particularly, to an improved method and apparatus for combining electric signals in a seismic exploration system in such manner as to emphasize correlative information in the respective signals while suppressing non-correlative information therein.

Seismic processing is generally carried out by introducing seismic signals or pressure waves into the earth at a location usually referred to as a shot point by, for example, detonating an explosive charge. Geophones, e.g., velocity or pressure sensitive detectors, usually arranged in an array at the surface of the earth, are utilized to convert the seismic signals into correspondingly varying electric signals. The geophones will respond to any seismic waves or motion detected, however, the seismic signals of interest in a reflection seismic system are those which are reflected from an interface or boundary between different layers of interest within the earth. Thus, it will be appreciated, that the electric signals of interest are very often obscured by interferring electrical signals caused by disturbances such as noise both from within the earth itself as well as surface conditions affecting the geophone directly. Accordingly, various techniques have been devised for accentuating the electric signals of interest representing reflections and suppressing undesired interference signals.

A known technique for enhancing the reflection signals is to algebraically mix the electric signals derived from two or more seismic records or geophones in the array usually with the result that the electric reflection signals which are repeated in each geophone output will be strengthened and the non-corresponding electric interference signals will be suppressed. However, one disadvantage of this technique is that signal redundancy is produced. In other words, algebraic mixing applied to the electric signals produced by geophones in the array cause the electric signal representing the desired reflection information to be imposed on the signal which is the result of mixing with other electric signals from other geophones in the array in which the reflection information signal does not appear or has not been detected. Algebraic mixing of signals also causes what is known as "run-out" of the reflection signals on the resulting mixed signal when the electric signals being mixed have the reflection signals thereon staggered time wise with respect to one another. "Run-out" is that phenomenon wherein the reflection signals are reproduced for a number of cycles beyond their actual occurrence. A better understanding of redundancy and run-out may be obtained from the detailed explanation of the invention which follows.

A novel technique which can be applied to seismic signals or records for emphasizing correlative information while suppressing non-correlative information is called like-sign mixing. The technique comprises mixing corresponding portions of the electric signals from the geophones or traces only if the corresponding signal portions thereof are all of the same polarity. A zero output results from the mixing if the corresponding portions of the electric signals are not of the same polarity, or if any one is zero. Although the like-sign mixing technique per se, has the disadvantage, in certain situations, of suppressing reflection signals as well as the interference signals, it has been found in accordance with the present invention that like-sign mixing may be employed as an element of a novel technique which does not suffer these disadvantages.

The invention provides a method as well as apparatus for accentuating the correlative data in a seismic reflection system and suppressing the non-correlative signals by algebraically mixing electric signals obtained from an array of geophones or a record of said geophone signals followed by like-sign mixing of the electric signals resulting from the algebraic mixing.

Accordingly, it is the main object of the present invention to provide a method and apparatus for combining electric signals in such manner as to emphasize correlative information in the respective signals while suppressing non-correlative information therein.

It is another object of the present invention to provide a method and apparatus for mixing of electric signals without producing redundancy or run-out of information signals.

Another object of the invention is to provide apparatus for performing an algebraic mix followed by a like-sign mix on electric signals without incurring the disadvantages of either.

Briefly, the invention comprises a method of processing a plurality of signals in which correlative data is distinguished from non-correlative data in the respective signals. The method includes the steps of isolating the signals into at least two groups and algebraically mixing the signals within each group to produce an algebraically mixed signal from each group. The method also includes the steps of comparing the polarities of corresponding portions of the algebraically mixed signal from each of said groups and further algebraically mixing the algebraically mixed signal from each of said groups. A portion of said further algebraically mixed signal which includes the corresponding portions of the algebrically mixed signal is passed to an output when an agreement of polarities of the corresponding portions of the algebraically mixed signal from each of said groups is obtained. Broadly, the invention can be described as an algebraic mixing function followed by a like-sign mixing function.

The invention also includes a system for processing a plurality of electric signals wherein an output is produced in which correlative data is enhanced and non-correlative data is suppressed. The system comprises means for isolating the electric signals into at least two groups with means for algebracially combining the electric signals in each group. Means are included for providing an output polarity agreement signal when the instantaneous polarities of corresponding portions of the algebraically combined signal from each of the groups is alike. Means are also provided for further algebraically combining the signals from said groups and for applying a portion of the further algebraically combined signal to the output of the system in response to the output polarity agreement signal. The portion of the further algebracially combined signal includes corresponding like polarity portions of the algebraically combined signals from said groups.

The foregoing and other objects and benefits of the invention are described below in greater detail and are illustrated in the drawings, in which:

FIG. 1 is a partially schematic block diagram of the system for processing the seismic information.

FIG. 2 is a detailed circuit diagram of the positive and negative coincidence circuits, the "or" circuit, switch drive and bi-polar switch of the system depicted in FIG. 1.

FIG. 3 is a circuit diagram of the amplifier and clipper shown in block form on FIG. 1.

FIG. 4 is a block diagram of a digital embodiment for processing the seismic information.

FIG. 5 shows idealized record traces of seismic signals containing reflection information which are utilized in explaining the invention.

Figure 6:
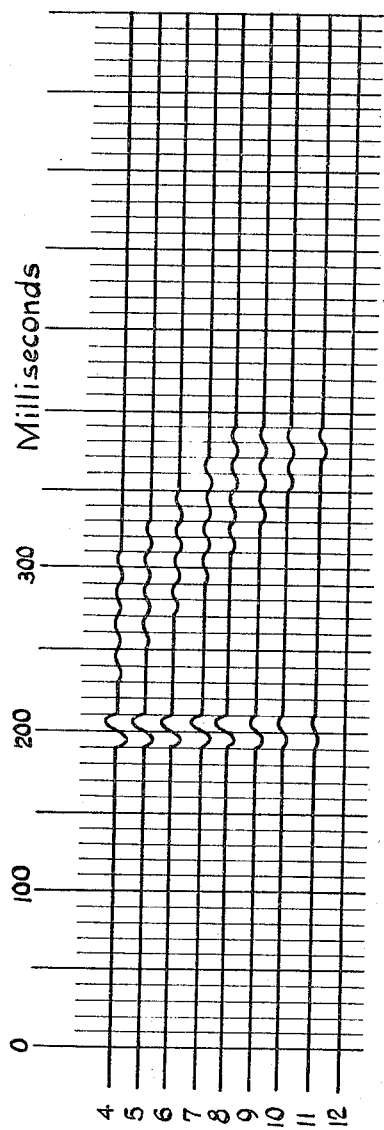
FIG. 6 depicts record traces obtained following the application of algebraic mixing to the electric signals of the record traces depicted in FIG. 5.

The method of the present invention is applicable to the information derived from the geophone directly. That is, it is applicable to direct field operation. However, the information obtained directly in the field contains serious factors which have in some situations, a destructive effect on the information signals. More particularly, there is a phase-time difference between the seismic signals received from different geophones due to weathering and elevation variations, requiring the corrections known in the art as static corrections, and due to the spread geometry of the geophones, requiring the corrections known as dynamic corrections. If the phase-time difference is too great, there is a possibility that the information might be sufficiently out of phase such that the algebraic mixing would produce cancellation rather than accentuation. Accordingly, the method is applicable to best advantage where the seismic signals utilized therein are reproduced from a recording wherein the phase-time difference has been compensated for. An example of means for correcting for phase-time shift may be found in U.S. Patent 2,638,402.

Referring to FIG. 1, there is shown a system for processing the seismic data which is introduced preferably from a multitrace recorder not shown, wherein a phase-time correction has been introduced. In this embodiment, seven traces or channels are reproduced marked 1 through 7. Each of the seven channels is connected to the respective isolation amplifier or amplifiers containing the same number as the channel. As can be seen there are 15 isolation amplifiers, and it will be noted that they are connected in groups of three. The first group being connected to channels 1, 2, 3, and the second group to channels 2, 3, 4, etc. The isolation amplifiers themselves may be any suitable amplifier capable of providing the required isolation many of which are in usage today. The outputs from the three isolation amplifiers in each group are algebraically mixed. This is accomplished by connecting the outputs of the isolation amplifiers in a group together after passing through proportioning resistors 11, 12 and 13. The algebraically mixed output voltage is obtained across summing resistor 22, which is connected between each of the combining points A, B, C, D and E of the groups of three outputs from the isolation amplifiers and ground. In a preferred embodiment the values of the proportioning resistors are chosen such that the resultant algebraic mix is a uniformly weighted combination. The algebraic mixing which has been performed in this particular case, is called three trace algebraic mix. It will be appreciated that the mix is not limited to three traces but can be utilized with any predetermined number of traces. Also the traces in a group do not necessarily have to be adjacent traces. For example, one group might contain traces 1, 3 and 5 and another 2, 4 and 6. This technique of skipping traces or having groups made up of non-adjacent traces is known in the art as skip-mixing. As can be seen, combining points A, B, C and D are connected to amplifier 33 via leads 35, 36, 37 and 38, respectively. Each of the leads 36 through 38 contains an isolation resistor 41, 42, 43 and 44, respectively. Likewise, combining points B, C, D, and E are connected to amplifier 34 via leads 55, 56, 57 and 58 containing an isolation resistor 61, 62, 63 and 64, respectively. The function of the proportioning resistors 11, 12, 13 will be best understood by considering the composition of the signal as it enters the D.C. amplifier 33 or 34. Assuming all the proportioning resistors 11, 12, 13 are equal and isolation resistors 41 through 44 are, among themselves, equal and summing resistors 22 are equal, the inputs to the operational amplifier 33 can be designated as $(1+2+3)+(2+3+4)+(3+4+5)+(4+5+6)$. Collecting like terms we have: $1(1)+2(2)+3(3)+3(4)+2(5)+1(6)$ where numbers in the parenthesis are ordinal numbers and represent amplitudes of original input traces. It can be seen that this gives an unequally weighted combination with traces three and four being dominant. This condition is called a tapered mix and may or may not be desired. Adjustment of the values of the proportioning resistors 11, 12, 13, etc. provides control of the weighting factors and may, for instance, be so chosen that the resultant is uniformly weighted. Resistors 41–44 and 61–64 are usually of the order of 50 to 100 times the value of the summing resistors 22 at points A through E. Resistors 41 to 44 and 61 to 64 are isolation resistors. It can be seen, for instance, that signals from combining point A on lead 35 must be isolated from the signals which are fed to isolation amplifier 34 from combining points B, C, D and E since A is not included in this group. It will be noted that the outputs of the algebraic mixing are grouped in groups of four for the like-sign mixing. The leads 35, 36 and 37 and 38 forming one group and leads 55, 56, 57 and 58 forming another group. The grouping of the outputs of the algebraic mixing for the like-sign mixing operation is not limited to groups of four but may contain any predetermined number of outputs in each group. However, it has been found that more reliable results are obtained by grouping a greater number of outputs from the algebraic mixing for the like-sign mixing than the number of input traces in the groups upon which the algebraic mixing is performed. The aforementioned groups of the outputs of the algebraic mixing are algebraically mixed or combined at point H and then amplified. The amplification is necessary to raise the level of the combined signal to a suitable level for operation of the bipolar switch 123. The amplification is provided by well known D.C. operational amplifiers which form no part of this invention per se and, accordingly, no further explanation thereof is believed to be necessary herein.

The combining points A, B, C, D and E are connected to amplifier-clipper elements 72, 73, 74, 75 and 76, respectively, via leads 81, 82, 83, 84 and 85. The amplifier-clippers 72–76 amplify and shape the signal for further operation in the system. The details of a preferred embodiment of the amplifier-clipper is shown in FIG. 3 and will be described in connection therewith. The outputs of the amplifier-clippers 72, 73, 74 and 75 are connected to both positive and negative coincidence circuits 91 and 92 via leads 93, 94, 95 and 96, respectively. Amplifier-clippers 73, 74 and 75 are also connected to positive and negative coincidence circuits 102 and 103 along with the output of amplifier-clipper 76. In other words, positive and negative coincidence circuits 91 and 92 compare the polarities of the outputs of amplifier-clippers 72 through 75. Positive and negative coincidence circuits 102 and 103 compare the polarities of the outputs of amplifier-clippers 73 through 76. The two undescribed portions of the system are similar and are connected to the positive and negative coincidence circuits 91, 92 and 102, 103, respectively, and accordingly, only the portion connected to the positive and negative coincidence circuits 91 and 92 will be described.

Postive coincidence circuit 91 compares the outputs of amplifier-clippers 72, 73, 74 and 75 and produces an output on the lead 112 if the amplifier-clipper outputs are all positive. Similarly negative coincidence circuit 92 compares the outputs of amplifier-clippers 72, 73, 74, 75 and produces an output on the lead 113 if the amplifier-clipper outputs are all negative. Leads 112 and 113 are both connected to the "or" circuit 114. The "or" circuit as its name implies produces an output when either one or the other of the inputs thereto is energized. Accordingly, an output would be obtained on lead 117 connecting the "or" circuit to switch drive circuit 118. The switch drive circuit 118 produces an output on leads 121 and 122 which are connected to bi-polar switch 123. The bi-polar switch 123 is driven to its conducting condition by switch drive 118 whenever there is a coincidence signal from either positive or negative coincident circuit 91 or 92. The bi-polar switch 123 is connected to the operational D.C. amplifier 33 and when in its conducting condition, allows the output from the D.C. operational amplifier to pass therethrough to the output. In essence, what has been accomplished is that a like-sign mix has been provided, that is, the mixing has been provided at combining point H and the like-sign has been determined by the associated positive and negative coincidence circuits. The very same situation exists with respect to the positive and negative coincidence circuits 102, 103 which are connected to an "or" circuit 131 via leads 132 and 133, respectively. The "or" circuit 131 is connected to a switch drive 134 by means of an electrical connection 135 and the switch drive 134 is connected to a bipolar switch 136. This bi-polar switch when driven to its conducting condition by switch drive 134 passes the algebraically mixed output from operational amplifier 34 to the output. Thus, a like-sign mix is performed on the algebraically mixed signals from combining points A, B, C, and D. Likewise, a like-sign mix is performed on the algebraically mixed signals from combining points B, C, D and E. It should be mentioned at this point that the algebraic mix performed at combining point H is a four trace mix, as can be seen from FIG. 1. However, any predetermined number of traces could have been utilized in each group to perform the like-sign mix operation.

In summary, the system of FIG. 1 shows the electric signals from seven channels being algebraically mixed in groups of three. The operation performed is known as three trace algebraic mixing. The outputs of the groups are combined in to further groups, this time containing four traces. The traces in each of these groups are algebraically mixed and are connected to the output only if the polarities of corresponding portions of the traces in the group are alike. If a polarity coincidence is not obtained, there is a zero output. This last mentioned operation encompassing the second algebraic mix and polarity coincidence is called like-sign mixing. The outputs therefrom contain the correlative information (corresponding portions of the traces in the original three input groups) which represents the reflection information in a form which can be easily observed, for instance in a recording trace. Accordingly, the output from the bi-polar switch can be conveniently recorded in a recorder 130.

It should be noted that many more channels of input information could be processed in the system by the addition of further groups in which the first algebraic mixing could be performed as well as subsequent groups within which like-sign mixing could be performed.

Referring to FIG. 2 there is shown the detailed circuit diagram of the positive and negative coincidence circuits such as 91 and 92 in FIG. 1 followed by an "or" circuit, the switch drive circuit and the bi-polar switch. The positive and negative coincidence circuits such as 91 and 92 may be of any suitable conventional type in which an output signal is obtained only when signals of the correct polarity appear simultaneously at each of the several inputs.

The circuit details of preferred coincidence circuits are depicted in FIG. 2. The positive coincidence circuit consists of diodes 141 each of which is connected in the output lead from the preceding amplifier-clipper. These diodes 141 are connected in the leads such that the anode of each diode is connected to a positive voltage source through resistor 124. Also, a further diode 143 is connected to the anode of diodes 141 through resistor 125 such that it provides negative clamping. The output of the circuit is also connected to the anode of diodes 141 through resistor 125. The operation of the positive coincidence circuit is such that the diodes 141 are conducting whenever the pulses received at points A, B, C or D are negative with respect to the voltage at the anode of the diodes 141. Under these conditions, these diodes conduct and no output signal is derived from the coincidence circuit. However, when the input signals are sufficiently positive, that is, reach a voltage value equivalent to the voltage applied to the anode of the diodes the cut-off point of the diode is reached and there is no further conduction. When all of the diodes are rendered non-conducting simultaneously, the voltage from the positive voltage source will be applied as a positive voltage output from the positive coincidence circuit.

The negative coincidence circuit similarly consists of a number of diodes 142 each of which is connected in one of the output leads from the preceding amplifier-clipper. The diodes 142 are reversed in polarity with respect to the diodes of the positive coincidence circuit. The voltage source provides a negative voltage which is applied to the cathode of the diodes 142 through resistor 126. The diode 144 is connected to the cathode of diodes 142 through resistor 127 and is reversed with respect to diode 143 of the positive coincidence circuit thus providing positive clamping. The otuput of the negative coincidence circuit is also connected to the cathode of diodes 142 through resistor 127. As would be expected, the operation is the same except for the polarities involved. For instance, no output is derived from the negative coincidence circuit as long as the inputs at $a$, $b$, $c$, and $d$ are positive with respect to the voltage applied through resistor 126 to the cathode of diode 142. However, when the inputs to all the diodes 142 reach a negative value equivalent to the negative volage applied to the cathode of the diodes, cut-off of the diodes takes place and there is no further conduction therethrough. In this case, the output of the circuit will be a negative voltage derived from negative source-V through resistors 126 and 127. The negative coincidence circuit is followed by a D.C. inverter stage 145 to invert the polarity of the signal applied thereto so that the pulses applied to the next circuit from both the positive coincidence circuit and the negative coincidence circuit are positive.

The embodiment of the "or" circuit depicted in FIG. 2, consists of a pair of diodes 147 connected to the outputs of each of the positive coincidence and negative coincidence circuits. These diodes 147 are connected so that the positive pulse applied to either one thereof will pass through. The pulse obtained at the output of the "or" circuit from either one of the diodes 147 is applied to switch drive circuit 118.

The switch drive or trigger cirrcuit 118 utilized herein has a connection 117 for applying the output of the "or" circuits to the grid of tube 148 of the trigger circuit. This positive pulse applied to the grid causes the normally non-conducting tube 148 to start conduction causing cut-off of conduction therein. The drop in plate potential of tube 148 is coupled to the grid of the usually conducting tube 149. The particular trigger circuit utilized is a mono-stable device and accordingly, the conduction of tube 148 is cut off and the conduction of normally conducting tube 149 resumes automatically. The time element or time that 148 remains conducting before the conduction reverts to its normal condition is determined by the RC time constant of resistor 128 and capacitor 129 which are connected between the plate of tube 148 and the grid of tube 149. The trigger circuit provides signals of the right polarity, when in its normal conducting condition, to maintain the bi-polar switch 123 in a non-conducting or off condition. As can be seen, the conduction of tube 148 and non-conduction of tube 149 provides a negative and a positive voltage signal respectively which allows the bi-polar switch to become conducting. The voltages are obtained from the plates of the tubes 148 and 149 and are applied to the succeeding switch via leads 151 and 152.

The bi-polar switch depicted in FIG. 2 consists of a bridge network in which each leg of the bridge contains a diode 157. These diodes are all similarly connected in each leg of the bridge and accordingly are conducting or non-conducting depending on the potential across the bridge legs in which the respective diodes are connected. A positive voltage +E is connected to the top nodal point of the bridge and a negative voltage —E is connected to the bottom nodal point. Ordinarily these voltages in conjunction with the input would tend to provide conducion of the diodes in the bridge. However, switch drive circuit 118 in its normal conducting condition, that is with tube 149 conducting and tube 148 cut-off provides a negative voltage at the top nodal point of the bridge via lead 152 and a positive voltage at the bottom nodal point of the bridge via lead 151. Under these conditions, none of the diodes 157 of the bridge are conducting and accordingly an input at the left nodal point will not have a through path to the output at the right nodal point. However, when the switch drive circuit 118 is triggered by a positive input at the grid of tube 148 causing reversal of the conduction of tube 148 which event results in reversal of conduction in tube 149, the potential fed to the upper and lower nodal points will accordingly be reversed and the diodes 157 will all be correctly polarized for conduction so that the input at the left nodal point will find a through path to the right nodal point and the output. It will be appreciated that the circuits represented by blocks in FIG. 1 are not necessarily limited to the particular circuits described herein and shown in detail in FIGS. 2 and 3. These circuits are shown to exemplify certain simple circuitry which is capable of performing the necessary operations represented by the blocks of FIG. 1. The output from the bi-polar switch is connected to a D.C. operational amplifier 160. This amplifier is utilized to bring the signal down to its original level from the amplified level to which it was raised in order to pass through the switch 123. FIG. 3 discloses the details of a circuit capable of performing the amplifier-clipper operation performed by elements 72–76 of FIG. 1. The D.C. amplifier 161 provides reversal of the pulses fed thereto. The output of the D.C. amplifier 161 is connected to the mid-point of a voltage divider 137, the upper end of which is connected to a positive voltage source and the lower end thereof which is connected to a negative voltage source. The input to the D.C. amplifier 161 is also connected to the upper end and lower end points of the voltage divider through diodes 162 and 163, respectively. It will be noted that the diodes 162 and 163 are reversed with respect to each other. The diode 162 is polarized such that the anode is connected to the input of the amplifier-clipper while diode 163 is oppositely connected. Accordingly, the operation is such that the input to the D.C. amplifier 161 is reversed and applied to the mid-point of voltage divider 137 which if the positive and negative potential sources are of equal value and the resistances on either side of the mid-point are of equal value will usually be at a zero potential. Also, the input depending on its polarity, for example, if the input is positive, neither of the diodes 162, 163 conduct until the voltage reaches a value above the cut-off potential of diode 162 at which time the diode conducts providing clipping of the positive input voltage. Likewise, when the input is sufficiently negative to cause conduction of diode 163 clipping of the negative input is likewise provided. The function of the amplifier clipper is to convert the input signals into square waves having constant amplitude and having a polarity depending on that of the input signal, with the output passing through zero at the zero crossings of the input signals. These square waves simultaneously drive one of the inputs each of a positive coincidence and a negative coincidence circuit.

Another apparatus by means of which the instant invention can be practiced is a digital computer. In this embodiment, the input waveforms must be converted into a digital representation. This is accomplished by sampling or quantizing the voltage levels of the waveforms at close intervals a high speed and converting the voltage levels obtained thereby into corresponding digital representation. It will be appreciated that the steps of the methods can be easily performed in a digital computer. For example, the digital numbers representing the seismic traces can be stored in the computer storage such as a high speed drum storage from which they can be read at high speed when needed to perform the algebraic mix thereon. The algebraic mix operation can be easily performed in the arithmetic unit since the operation entails simple mathematical steps, that is, addition and division by a number corresponding to the number of digital values being added. Of course, the transfer of the numbers to be added from storage is under the control of a control unit which serves as the built in program of the computer. This unit could be the usual diode matrix mechanization. This control can easily control the selection of the predetermined digital numbers from storage representing the traces to be grouped. Likewise, the unit can be mechanized to control the grouping for the like-sign mixing.

The like-sign mixing operation requires determining whether the corresponding portions of the traces entering the computation are of like sign. This can be accomplished in a variety of known ways, for example, a simple digital comparator can be used to determine this function. If the signs of the digital numbers representing the corresponding portions of the traces are all of like sign, a further algebraic mix is performed in the arithmetic unit. The output or result of the digital computation can be utilized in digital form. However, in our arrangement, it has been found to be more beneficial to convert the digital result into an analog form. This is done by one of the well known digital to analog converters. In our case, the analog form obtained is a resulting trace which has the benefits of algebraic mixing followed by like-sign mixing and accordingly the desired reflection information is accentuated and the noise and clutter is attenuated if not completely removed.

FIG. 4 depicts a block diagram of a digital apparatus capable of carrying out the method of this invention. The input seismic traces are converted to a digital form by an analog to digital quantizer 171. The resulting digital representation is applied to an algebraic adder 172 where the digital representations of the input seismic traces are algebraically added in groups of three, in this case. It will be appreciated that a digital computer is usually not a real time device as is an analog computer. Accordingly, the algebraic addition takes time and is preferably accomplished by one adder. In other words the mechanization can be time shared so that programming control and storage are necessary to perform the repetitive operations. This cuts down considerably on the amount of equipment necessary in situations where large numbers of repetitive operations are performed.

The results of the algebraic addition applied to each group of three inputs to the algebraic adder is shown as being applied to both a multiplier 173 and a second algebraic adder 174 via leads 181 through 184 and 186 through 189, respectively. It can be seen that the outputs from the algebraic adder 172 are separated into groups of four. In FIG. 4 only the first group is shown. The second group would consist of the leads marked (b+c+d), (c+d+e), (d+e+f) and (e+f+g). The multiplier performs the multiplication function on the inputs thereto and provides a pulse or "1" output when all the inputs are designated as being of like sign and "0" or no output when all the inputs are not designated as being of like sign.

The output of the multiplier controls an "and" gate 191 which has as an input thereto the results from algebraic adder 174. The "and" gate requires that the inputs thereto be energized simultaneously to produce an output. Accordingly, an output is obtained from the "and" gate 191 only when the results of the algebraic addition are present and the output of the multiplier is "1" indicating that the inputs to the multiplier were of like sign. The output, if any, of "and" gate 191 consists of the results of the algebraic addition which, in our case is converted to a trace by a recorder apparatus connected to a digital to analog converter 192. The above-described apparatus has applied an algebraic mix followed by a like-sign mix to the seismic traces and accordingly the output trace is characterized by accentuated reflection information and attenuated noise. The main advantage of the digital mechanization over the analog mechanization heretofore described is the improved accuracy that is obtainable and more important the ability to handle a great many more traces simultaneously with a very small increase in equipment in comparison to the additional equipment which would be required in the analog mechanization.

An illustrative group of traces representing signals from a seismic exploration system is depicted in FIG. 5. The twelve traces shown therein contain equal (unit) amplitude of 12½ cycles per second sine waves. The phase difference from trace to trace is 90°. A pulse of 1 cycle of a 50 c.p.s. sine wave is shown on the first eight traces centered on the 200-millisecond time line. An identical pulse is shown on trace number 1 centered at time 240 ms. and 20 ms. later on each successive trace through trace 8. The 50 c.p.s. pulses have amplitudes equal to one fourth the unit amplitude of the 12½ c.p.s. waves. The 50 c.p.s. pulses illustrate reflection signals obtained in the seismic exploration while the 12½ c.p.s. signals are representative of the interference encountered.

FIG. 6 shows the wave forms of FIG. 5 after the application thereto of a four-trace algebraic mix. It will be noted that traces No. 1, 2 and 3 have been removed from the record. Trace No. 4 represents the sum of traces No. 1, 2, 3, and 4 divided by four (the number of traces mixed together). Thus, trace No. 5 is one-fourth of the sum of traces No. 2, 3, 4 and 5. Recalling that the 50 c.p.s. pulses do not exist beyond trace 8, it is found that the pulses on FIG 6 exist as far as trace 11. The pulses appearing on traces 9, 10 and 11 have amplitudes that decrease to ¾, ½ and ¼ of the amplitude found on trace 8.

The series of staggered pulses which start centered at 240 ms. on trace No. 1, having a period of 20 ms. and duration of 20 ms., on FIG. 5 adds up by the four trace algebraic mixing process to produce a train of four cycles on each trace from No. 4 through No. 8, three cycles on No. 9, two cycles on trace No. 10 and 1 cycle on trace No. 11. It is clear that the algebraic mixing process applied to the traces of FIG. 5 has propagated the pulses three traces beyond the point at which they actually terminated. This is an example of the previously referred to redundancy that results from the application of algebraic mixing. The reproduction of the staggered pulses starting at 240 ms. to more than one cycle on each trace is what has been previously referred to as "run out."

Figure 7:
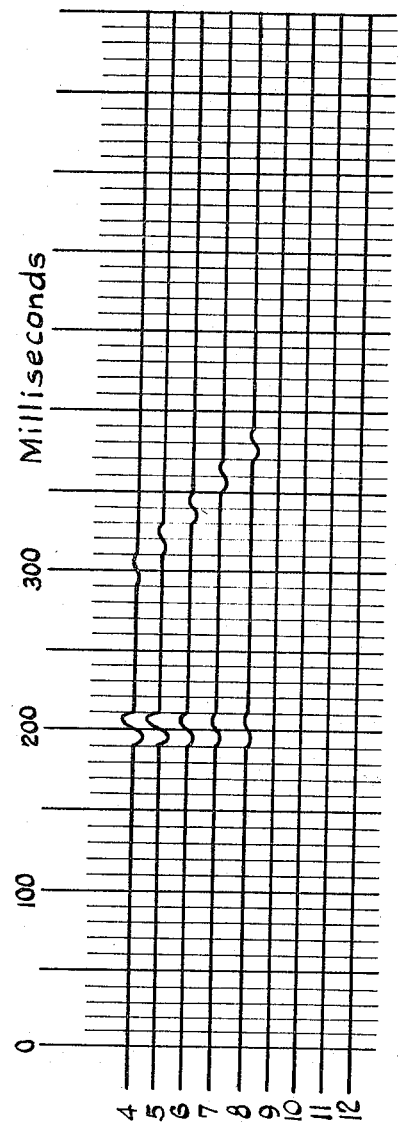
FIG. 7 shows the record traces obtained after the application of like-sign mixing to the electric signals of the record traces depicted in FIG. 6.

FIG. 7 shows the effect of applying a four trace like-sign mix to the traces depicted in FIG. 6. The requirement has been imposed that a pulse must be present on four consecutive traces in order to appear in the output of the like-sign mix process. The question occurs at this time as to what trace of the original traces of FIG. 5 corresponds to what time of FIG. 7. The pulse centered at 200 ms. does not help in answering the question but the pulse in the staggered train which centers at 300 ms. indicates that the first trace appearing on FIG. 7 is the equivalent of trace No. 4 of FIG. 5. It should be noted that FIG. 7 depicts the pulses as ending on trace No. 8, as was true in FIG. 5 and the staggered pulse has been restored to a single cycle rather than the wave train which existed in FIG. 6.

It is worthy of note that the pulses centered at 200 ms. survived these operations without loss of amplitude while the staggered pulses came through at one-fourth their original amplitude. There was no overlap of the staggered pulses in the original wave forms of FIG. 5 nor is there any in the wave forms of FIG. 7. It will be appreciated that an additional step of like-sign mixing applied to the signals represented by the wave forms of FIG. 7 would cause the staggered pulses to disappear from the traces. This would require only a two-trace like sign mix to bring it about.

It will be appreciated that the 50 c.p.s. pulses represented in the traces of FIG. 5 could not be obtained by the application of a like-sign mix directly but requires the application of algebraic mixing followed by the like-sign mixing. Actually, the application to the traces of FIG. 5 of a three trace or greater like-sign mix would produce a zero output at all times. That such a result would be obtained can be seen from a consideration of the result that would be obtained from the application of a two trace like-sign mix to the signals of FIG. 5. Keeping in mind that the 12½ c.p.s. waves are dominant in amplitude, being four times as large as the 50 c.p.s. pulses, and that the 90° phase difference between adjacent traces of the 12½ c.p.s. waves results in the adjacent traces being unlike in sign half of the time with the output of the process resulting in zeros half of the time. It should be noted that a non-zero output portion of any given trace of a record resulting from a two trace like-sign mix would have coincidence in time with a zero portion of its immediate neighbor. Since zero is, by definition in the like-sign mix process, an unlike sign, it can be seen that one more step of like-sign mixing will cause the result to collapse to zero at all times. It would not matter how many times the process were repeated beyond the three trace like-sign mix step; the output would remain zero.

It has thus been demonstrated that desired reflection information may be accentuated and the interference signals attenuated by the successive application of algebraic mixing followed by like-sign mixing and that the equivalent result cannot be obtained by either process alone nor by the two processes in reverse sequence.

Obviously, many modifications and variations of the invention as hereinabove set forth, may be made without departing from the spirit and scope thereof, and therefore, only such limitations should be imposed as are indicated in the appended claims.

I claim:

1. A method of processing at least three signals in which correlative data is distinguished from non-correlative data in the respective signals, comprising the steps of arranging said signals into at least two groups, algebraically mixing the signals within each group and producing an algebraically mixed signal from each group, comparing the polarities of corresponding portions of the algebraically mixed signal from each of said groups, further algebraically mixing the algebraically mixed signal from each of said groups when an agreement of polarities of the corresponding portions of the algebraically mixed signal from each of said groups is obtained, and passing that portion of said further algebraically mixed signal which includes said corresponding portions to an output as an output signal and providing no output signal at said output when said agreement of polarities is not obtained.

2. A method of processing at least three signals in which correlative data is distinguished from non-correlative data in the respective signals, comprising the steps of arranging said signals into at least three first groups, algebraically mixing the signals within each group and producing an algebraically mixed signal from each group, arranging the algebraically mixed signals from said first groups into second groups, comparing the polarities of corresponding portions of each of said algebraically mixed signals in each of said second groups, further algebraically mixing the algebraically mixed signals in each of said second groups when an agreement of the polarities of the corresponding portions of the algebraically mixed signals of the corresponding second group is obtained, and passing that portion of said further algebraically mixed signals which includes said corresponding portions from each of said second groups to an output as an output signal and providing no output signal at said output when said agreement of polarities is not obtained.

3. A method according to claim 1, wherein said groups each contain a predetermined equal number of signals, the signals in each group being shifted from the correspondingly positioned signals in adjacent groups by a one signal displacement.

4. A method according to claim 2, wherein said second groups each contain a predetermined equal number of algebraically mixed signals, and correspondingly positioned algebraically mixed signals in adjacent groups are shifted with respect to one another by a one signal displacement.

5. A method according to claim 1, comprising the further step of weighting said signals in each of said groups so as to predetermine their proportionate contribution to the subsequent algebraic mix.

6. A method according to claim 1, comprising the further step of amplifying and shaping the algebraically mixed signal from each of said groups in order to provide a better comparison of the polarities of corresponding portions thereof.

7. A method of processing at least three seismic data signals so that correlative reflection data in the signals will be enhanced and non-correlative data will be suppressed, comprising the steps of arranging said seismic data signals into at least two groups, algebraically mixing the signals within each group and providing an algebraically mixed signal from each group, comparing the polarities of corresponding portions of the algebraically mixed signal from each of said groups, further algebraically mixing the algebraically mixed signal from each of said groups when an agreement of polarities of the corresponding portions of said algebraically mixed signal from each of said groups is obtained, and passing that portion of said further algebraically mixed signal which includes said corresponding portions to an output as an output signal and providing no output signal at said output when said agreement of polarities is not obtained.

8. A method for processing at least three seismic data signals wherein correlative reflection data in the signals is enhanced and non-correlative data is suppressed, comprising the steps of isolating said seismic data signals into at least three first groups, algebraically mixing the seismic data signals in each of said first groups, arranging the algebraically mixed signals from said first groups into second groups, comparing the polarities of corresponding portions of the algebraically mixed signals from said first groups in each of said second groups, further algebraically combining the algebraically mixed signals from said first groups in each of said second groups when the polarities of the corresponding portions are alike, and passing to an output as an output signal that portion of said further algebraically combined signal which includes the corresponding portions of the algebraically mixed signals from said first group and providing no output signal at said output when said agreement of polarities is not obtained.

9. A method according to claim 7 wherein said groups each contain a predetermined equal number of seismic data signals, and the seismic data signals in each group are shifted from the correspondingly positioned signals in adjacent groups by a one signal displacement.

10. A method according to claim 8, wherein said second groups each contain a predetermined equal number of seismic data signals, and correspondingly positioned seismic data signals in adjacent groups are shifted with respect to one another by a one signal displacement.

11. A method of processing at least three signals wherein correlative data is distinguished from non-correlative data in the respective signals, comprising the steps of comparing the polarities of corresponding portions of the plurality of signals, algebraically mixing the plurality of signals when said corresponding portions of said plurality of signals have like polarities, and producing an output signal comprising the algebraically mixed corresponding portions of said signals and providing no output signal when said agreement of polarities is not obtained.

12. A method according to claim 11, comprising the further steps of amplifying and shaping said signals before said comparison step.

13. A method for processing at least three seismic data signals wherein correlative data is enhanced and non-correlative data is suppressed, comprising the steps of comparing corresponding portions of said seismic data signals, algebraically combining said seismic data signals when said corresponding portions of said seismic data signals have a like polarity, and producing an output signal comprising said corresponding portions of said algebraically combined seismic data signals and providing no output signal when said agreement of polarities is not obtained.

14. A system for processing at least three electric signals wherein an output is produced in which correlative data is enhanced and non-correlative data is suppressed, comprising means for separating said electric signals into at least two groups, means for algebraically combining the electric signals in each group, means for providing a polarity agreement signal when the instantaneous polarities of corresponding portions of the algebraically combined signal from each of said groups is alike, means for further algebraically combining the algebraically combined signal from said groups in response to said polarity agreement signal, means for applying a portion of the further algebraically combined signal to the output of said system, said portion of the further algebraically combined signal including corresponding portions of the algebraically combined signal from each of said groups having like polarities.

15. A system according to claim 14, wherein said means for applying a portion of the further algebraically combined signal to the output of said system comprises a switching means and a switch drive means said switch drive means being responsive to said polarity agreement signal and providing the bias to operate said switch means to connect said portion of the further algebraically combined signal to said system output.

16. A system for processing at least three electrical signals wherein outputs are produced in which correlative data is enhanced and non-correlative data is suppressed comprising means for isolating said electrical signals into at least three first groups, means for algebraically combining the electric sigals in each of said groups, means for isolating the algebraically combined electric signals from said first groups into second groups, means connected in each of said second groups for producing a polarity agreement signal when the instantaneous polarities of corresponding portions of each of said algebraically combined signals from said first groups in a second group are alike, means for providing a further algebraic combining of the algebraically combined signals from said first group in each of said second groups when a polarity agreement signal is provided for the corresponding group in said second groups, means for connecting a portion of the further algebraically combined signal from each of said second groups to a corresponding output of the system, said portion of the further algebraically combined signal including the corresponding portions of each of said algebraically combined signals from said first groups in a second group having like instantaneous polarities.

17. A system according to claim 14, wherein a predetermined equal number of electrical signals are isolated to form each of said groups, the electrical signals in each group being shifted from the correspondingly positioned electrical signals in adjacent groups by a one signal displacement.

18. A system according to claim 16, wherein a predetermined equal number of electrical signals are isolated to form each of said second groups, the electrical signals in each of said second groups being shifted from the electrical signals in adjacent groups by a one signal shift.

19. A system according to claim 14, wherein weighting means are provided for each of said electrical signals in each of said groups to predetermine their proportionate contribution to the subsequent algebraic mix.

20. A system according to claim 14, further comprising amplifying and shaping means connected between said groups of electrical signals and said polarity agreement means to amplify and shape said algebraically combined signals.

21. A system for processing at least three seismic data signals and for producing an output in which correlative reflection pulses are enhanced and non-correlative data pulses are suppressed, comprising means for isolating said seismic data signals into at least two groups, algebraic combining means for producing a mixed seismic data signal output from each of said groups, polarity agreement means connected to each of said groups for producing a polarity agreement signal when the instantaneous polarities of corresponding portions of each mixed seismic data signal from said groups are alike, second algebraic combining means connected to each of said groups for producing an output in which the mixed seismic data signals from each of said groups are algebraically combined upon the reception of the polarity agreement signal from said polarity agreement means, and switching means connected to said polarity agreement means and said second algebraic combining means for connecting a portion of the output from said second algebraic combining means to the output of said system, said portion of the output from said second algebraic combining means including the corresponding portions of each mixed seismic data signal from said groups having like polarities.

22. A system for processing at least three seismic data signals and producing an output in which correlative reflection pulses in the signals will be enhanced and non-correlative pulses will be suppressed, comprising algebraic mixing means for combining the seismic data signals into a single seismic data output signal, polarity agreement means connected in parallel with said algebraic mixing means and to which each of said plurality of seismic data signals is applied, said polarity agreement means producing an output signal when the instantaneous polarities of corresponding portions of each of said seismic data signals are alike, and switching means connected to said polarity agreement means and said algebraic mixing means for connecting a portion of the single seismic data output signal to the output of said system upon receiving said output signal from said polarity agreement means, said portion of the single seismic data output signal including the corresponding portions of each of said seismic data signals having instantaneous like polarities.

References Cited by the Examiner
UNITED STATES PATENTS

| 2,972,733 | 2/1962 | Bucy | 340—15.5 |
| 3,149,302 | 9/1964 | Klein et al. | 340—15.5 |

BENJAMIN A. BORCHELT, *Primary Examiner.*

R. M. SKOLNIK, *Assistant Examiner.*